May 12, 1959 C. A. CHAYNE Re. 24,645

ENGINE CONSTRUCTION

Original Filed Feb. 27, 1952 6 Sheets-Sheet 1

Inventor
Charles A. Chayne
By
R. D. Burch
Attorneys

ENGINE CONSTRUCTION

Original Filed Feb. 27, 1952 6 Sheets-Sheet 2

Inventor
Charles A. Chayne
By L. D. Burch
Attorneys

ENGINE CONSTRUCTION

Original Filed Feb. 27, 1952 6 Sheets-Sheet 3

Inventor
Charles A. Chayne

By
L. D. Burch
Attorneys

ENGINE CONSTRUCTION

Original Filed Feb. 27, 1952 6 Sheets-Sheet 4

Inventor
Charles A. Chayne
By
L. D. Burch
Attorneys

ENGINE CONSTRUCTION

Original Filed Feb. 27, 1952 6 Sheets-Sheet 5

Inventor
Charles A. Chayne
By
R. D. Burch
Attorneys

ENGINE CONSTRUCTION

Original Filed Feb. 27, 1952 6 Sheets-Sheet 6

Inventor
Charles A. Chayne
By
L. D. Burch
Attorneys

United States Patent Office

Re. 24,645

Reissued May 12, 1959

24,645

ENGINE CONSTRUCTION

Charles A. Chayne, Bloomfield Hills, Mich., assignor to General Motors Corporation, Detroit, Mich, a corporation of Delaware Original No. 2,781,750, dated February 19, 1957, Serial No. 273,597, February 27, 1952. Application for reissue October 29, 1958, Serial No. 770,890

24 Claims. (Cl. 123—55)

Matter enclosed in heavy brackets [ ] appears in the original patent but forms no part of this reissue specification; matter printed in italics indicates the additions made by reissue.

This invention relates to internal combustion engines and has particular relation to V-type engines to be employed in the operation of motor vehicles and for other purposes.

It is proposed to construct a lightweight, efficient, high-powered engine capable of operating and fitting within the limited space in the engine compartment of a low body style, high speed passenger automobile of advanced design.

In order to provide lightness of weight, it is proposed to so design the engine that it can be largely constructed of aluminum and magnesium alloy castings and stampings, with only a limited number of the more highly stressed parts of the engine being made of steel and other heavier metals. To conserve space and to provide for ease in assembling and servicing the engine, it is proposed to provide a charge forming device and timing mechanism unit which can be installed in the engine as a separate and removable mechanism unit. In order to conserve height in front of the engine, it is proposed to design the cooling system of the engine so that the surge tank for the radiator of the engine is mounted on top of the engine and above the level of the cooling liquid therein. To conserve width for locating the steering gear for the vehicle and other accessory apparatus for the vehicle and the engine, it is proposed to make the crankcase of the engine as narrow as possible immediately below the cylinders of the engine. Then in order to provide the greatest possible road clearance with such a low height engine which is wide at the upper ends of the cylinders but narrow below the cylinders, it is proposed to extend the crankcase outwardly at the bottom so as to provide a wide shallow chamber of sufficient capacity to hold the lubricating oil required for operating the engine. To provide for high power and efficient operation, the engine is provided with large inlet and exhaust valves in the heads of the engine and with inlet and exhaust passages which lead to and from the valves by the most direct and least curved and pocketed route which it has been possible to provide. The engine may be supercharged and provided with dual carburetors supplying fuels of widely different octane rating and volatility.

Figure 1:
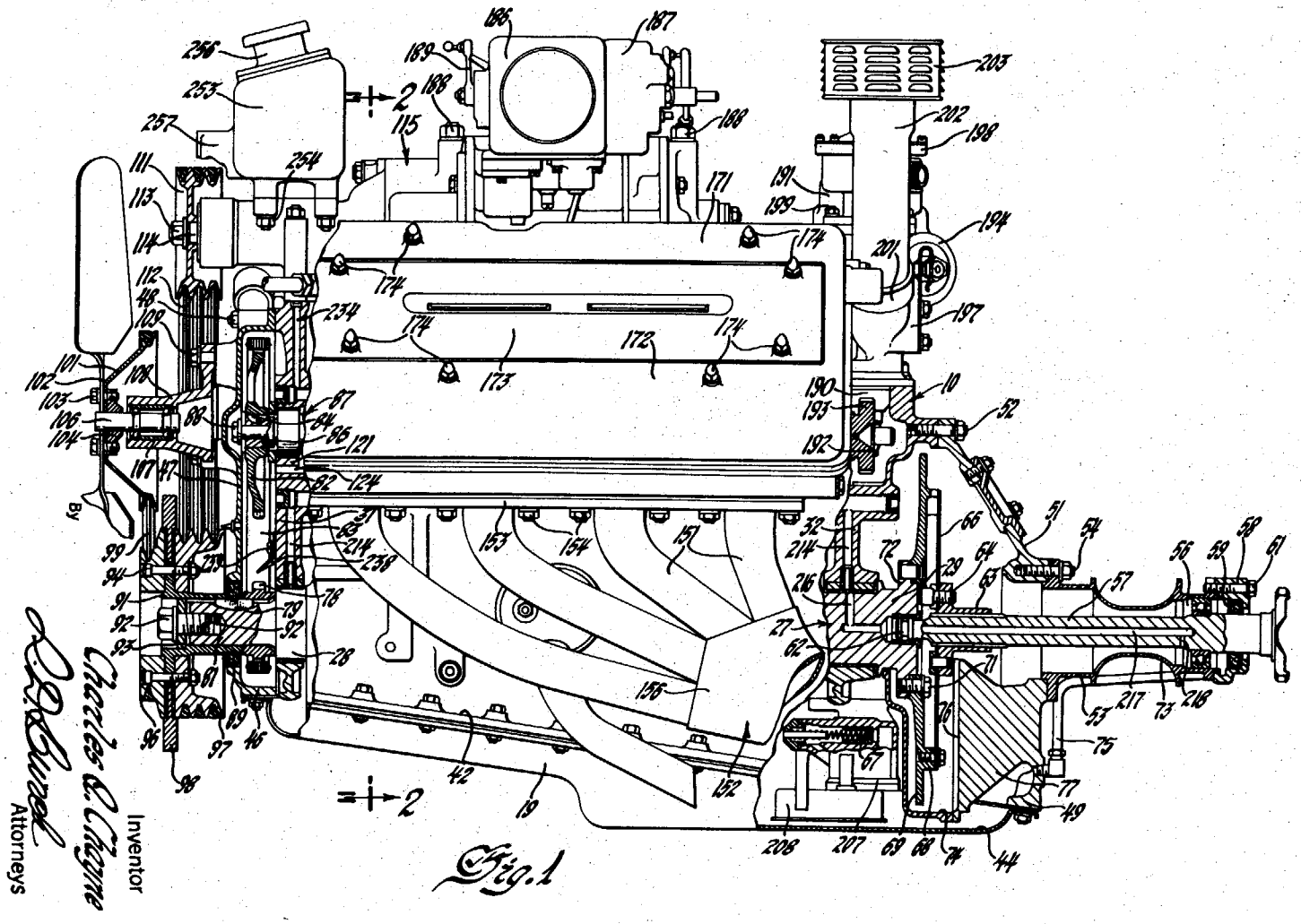
Figure 1 is a side elevational view with certain parts thereof broken away and shown in cross-section, of an engine embracing the principles of the invention.
Figure 2:
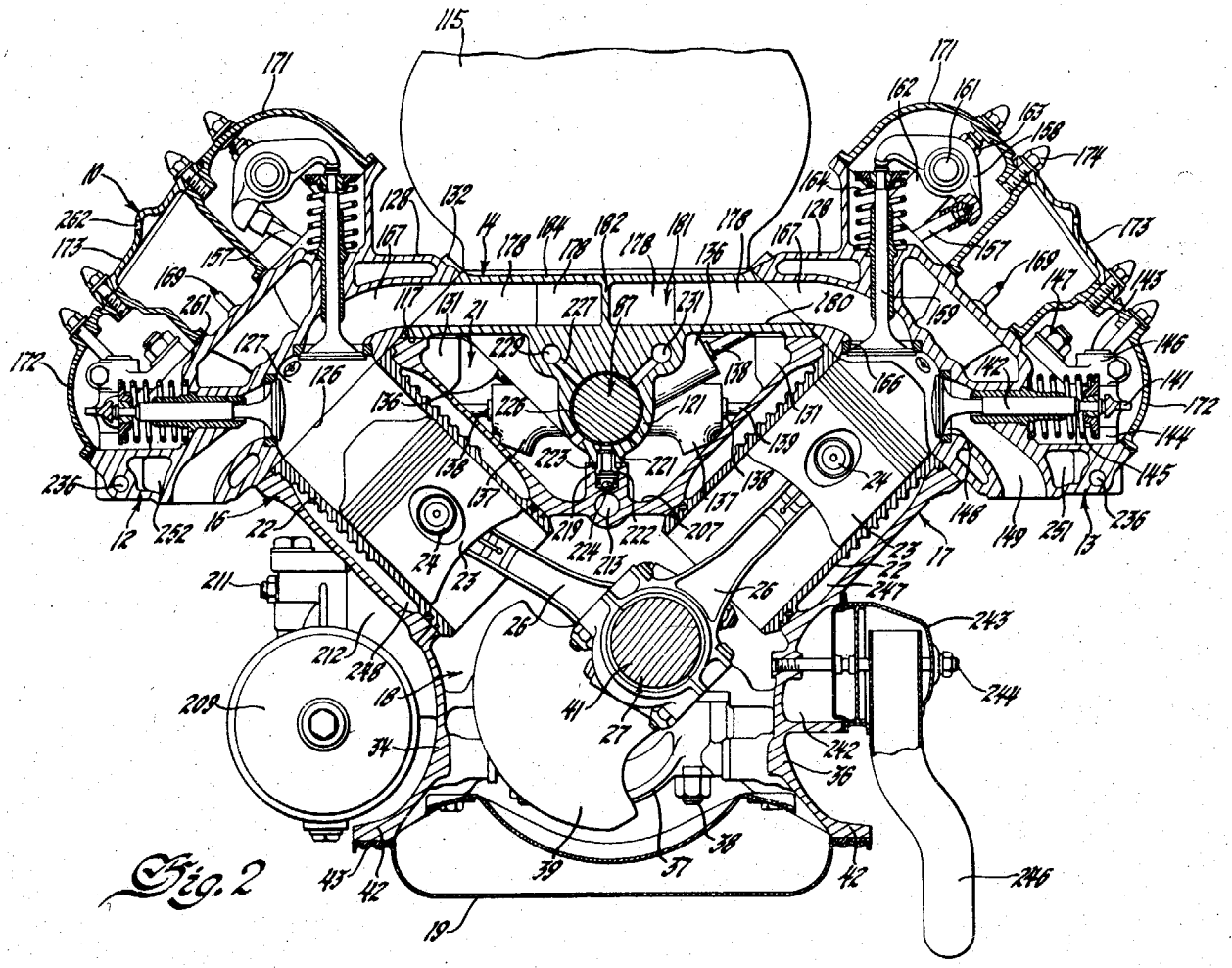
Figure 2 is a cross-sectional view of the engine disclosed by Figure 1, taken substantially in the plane of line 2—2 on Figure 1, looking in the direction of the arrows thereon.
Figure 3:
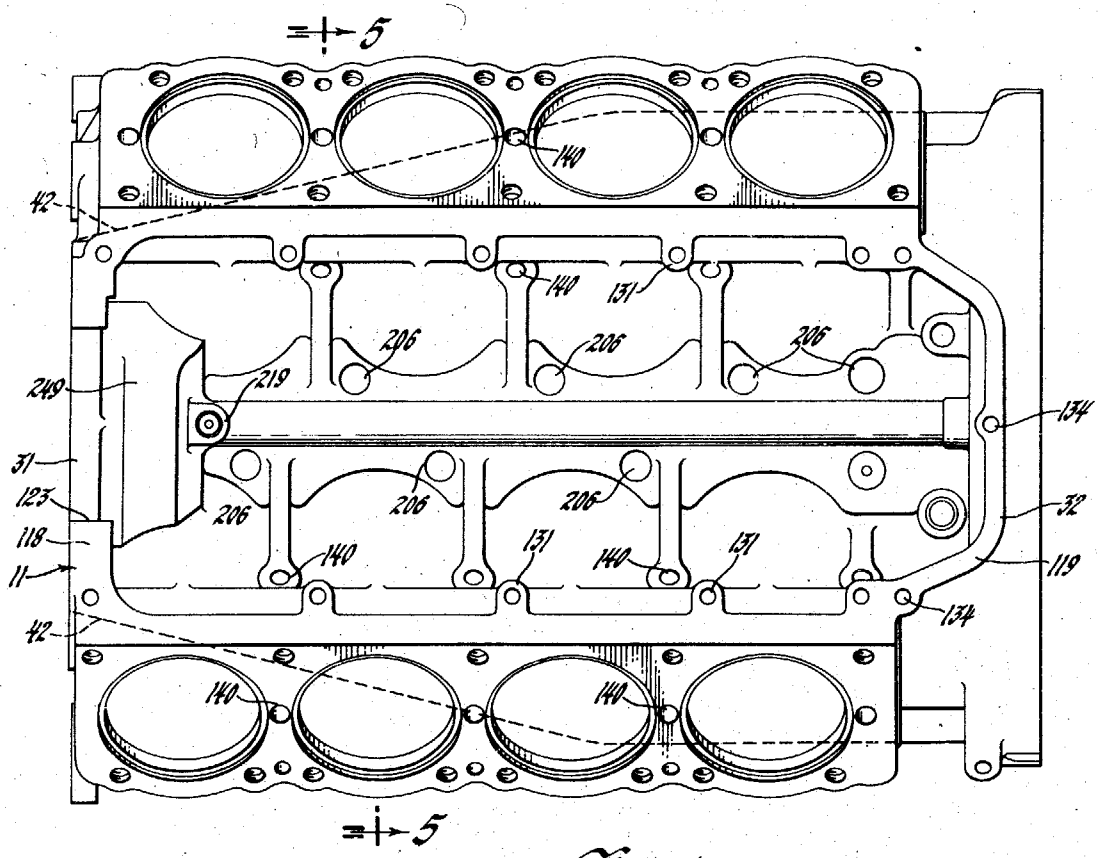
Figure 3 is a plan view of the cylinder block employed in the engine disclosed by Figures 1 and 2.

The structural or frame members of the engine comprise essentially an engine block 11, right and left hand engine heads 12 and 13 respectively and an operating unit support member 14. The block 11 comprises right and left hand rows or banks of cylinders 16 and 17 respectively and a crankcase 18 adapted to be closed at the bottom by an oil pan 19. In the present instance the cylinder banks 16 and 17 are disposed at 90° with respect to one another, although they may be arranged in other angular positions if such is desired. The space between the cylinder banks 16 and 17 provides a camshaft gallery 21 within which the support member 14 is adapted to be located and the upper part of which may be closed by the support member 14. The cylinders of the engine are formed by inserted sleeves indicated at 22 which are adapted to receive pistons 23 connected by piston pins 24 to connecting rods 26 which are operated by the crankshaft of the engine indicated at 27. The crankshaft has front and rear bearings 28 and 29 respectively supported in the front and rear walls of the block as indicated at 31 and 32. The crankshaft 27 also has intermediate bearings between each pair of the cylinders of the engine which are supported by webs 33 which extend transversely across the upper part of the crankcase 18 between crankcase side walls indicated at 34 and 36. Bearing caps 37 secured to the webs 33 by studs 38 form the remaining parts of the intermediate bearings for the crankshaft 27. The crankshaft 27 has counterweights 39 for balancing the cranks 41 each supporting two of the connecting rods 26. The side walls 34 and 36 of the crankcase 18 are convexly curved outwardly in formation from front to rear of the crankcase. The most inwardly curved parts of each of the walls 34 and 36 are approximately in the plane of the axis of the crankshaft 27 and these parts extend inwardly as far as is possible without interfering with the operation of the crankshaft 27 to provide a crankcase of minimum width in this plane. Below the axis of rotation of the crankshaft 27, the walls 34 and 36 curve outwardly and there terminate in flanges 42 to which the sides of the oil pan indicated at 19 are secured. However, the flanges 42 are not the same distance from one another, nor are they the same distance from the centerline of the crankshaft 27 from front to rear of the engine. For example, the flanges 42 extend downwardly from front to rear of the engine at the uniform slope relative to a horizontal plane through the axis of rotation of the crankshaft 27 (see Figure 1). Also the flanges slope outwardly with respect to one another and to the central plane of the engine from the front of the engine to about the middle of the engine and then the flanges extend to the rear of the engine in parallel relation to one another (see Figure 3). The oil pan 19 has flanges 43 which are shaped to fit the flanges 42 but the front part of the bottom of the pan slopes downwardly in parallel relation to the flanges 42 while the rear part thereof extends forwardly from slightly below the rear end of the flanges 42 in a plane which is parallel to a horizontal plane through the axis of rotation of the crankshaft 27. The rear part of the oil pan 19 therefore provides an oil sump indicated at 44 which is approximately rectangular in formation, and which extends between the parallel parts of the flanges 42 extending from about the middle to the rear of the engine. The front end of the oil pan 19 is secured to a lower wall 46 of the timing chain cover 47 which is bolted to the front wall 31 of the block 11 by bolts indicated at 48. The rear end of the pan 19 is secured to a flange 49 extending along the lower edge of a flywheel casing 51 which is secured by bolts 52 to the rear wall 32 of the engine block.

A tubular propeller shaft casing 53 is secured by bolts 54 to an opening in the rear wall of the casing 51. The tubular casing 53 has a bearing 56 adjacent the rear end thereof for supporting the rear end of a section of the propeller shaft of the engine indicated at 57. The end of the casing 53 beyond the bearing 56 is closed by a cap 58 and a seal 59 secured to the casing 53 by bolts indicated at 61. The forward end of the propeller shaft 57 is piloted at 62 in an axially disposed opening formed in the rear end of the crankshaft 27 and is provided with a flanged collar 63 adjacent the pilot end 62 which is secured by studs 64 to the inner periphery of a relatively flexible driving disc indicated at 66. The outer periphery of the driving disc 66 is secured by studs 67 to a circular row of projections 68 formed adjacent the outer periphery of the flywheel 69 of the engine. The flywheel 69 is secured by studs 71 to a driving flange 72 which is formed on the rear end of the crankshaft 27 beyond the bearing 29. The flexible driving plate or disc 66 tends to permit axial displacement of the rear end of the propeller shaft 57 about the pilot bearing 62 but without permitting any appreciable variation in angular velocity between the propeller shaft 57 and the crankshaft 27. The rear end of the propeller shaft 57 is adapted to be connected to another section of the propeller shaft, not shown, but which extends toward the rear of the motor vehicle and where a unitary transmission and differential unit may, if desired, be provided. The casing 53 also has formed therein a toroidal or annular depression indicated at 73 which may be employed for receiving rubber or other suitable resilient mounting members for mounting the rear end of the engine in the frame of the vehicle with which the engine is employed.

The flywheel 69 is prevented from engagement with the oil in the sump 44 by a cover 74 adapted to be secured at the rear edge thereof to a wall 76 extending behind the flywheel and which is supported from the casing 51 by an integral web indicated at 77. The casing 53 beyond the bearing 56 is drained by a conduit 75 which communicates with the crankcase 18 below the web 77.

Disposed on the end of the crankshaft 27, beyond the front main bearing 28 and within the timing gear cover [27] 47 is a gear or sprocket 78 which is keyed at 79 to the front end of the crankshaft indicated at 81. The gear 78 is adapted ot drive camshaft driving gear or sprocket 82 through a timing chain 83. The gear 82 is keyed at 84 to the front end 86 of an engine camshaft or timing means 87 and is held in position on the camshaft end 86 by a stud and washer indicated at 88.

The crankshaft end 81 also projects beyond the timing chain or gear cover 47 through a seal 89 and also has keyed thereto by key 79 a driving member indicated at 91. The driving member 91 is secured rigidly to the end of the shaft by a stud 92 and a washer 93. Secured by bolts 94 to the opposite flanged edges of the member 91 is a pair of driving pulleys indicated at 96 and 97. A rubber mounted torsional vibration damper indicated at 98 is secured by the bolts 94 to the member 91 between the pulleys 96 and 97. The pulley 96 through a V-belt 99 drives a pulley 101 to which the engine fan 102 is secured by studs indicated at 103. The hub 104 of pulley 101 is supported by a shaft 106 mounted in a ball bearing 107 secured in an opening formed in a support indicated at 108. The support 108 is secured by studs 109 to the front of the timing chain cover 47. Pulley 97 also drives a pulley 111 through a plurality of V-belts indicated at 112. The pulley 111 is secured by a nut and washer indicated at 113 to the threaded end of a shaft 114 which is employed in driving a supercharger indicated at 115. The supercharger 115 may be of any suitable type, although in the present instance a Roots blower type of supercharger is employed. The supercharger 115 is bolted or otherwise secured to the support member 14 between the engine heads 12 and 13.

The support 14 is supported upon a parallel pair of coplanar ledges which extend in parallel relation to one another along the upper ends of the inner walls of the cylinder banks 16 and 17 of the block 11. The end walls 31 and 32 of the block 11 also extend upwardly at the ends of the gallery 21 to close the gallery 21 except at the front end thereof and to support the front and rear ends of the support member 14 upon flanges 118 and 119 formed on the front and rear walls 31 and 32 respectively in the plane of the coplanar ledges 117. Formed on the lower side of the support 14 and within the gallery 21 is a plurality of aligned bearings 121 which are employed in supporting the camshaft 87 upon the camshaft bearing surfaces which are formed in spaced relation throughout the length thereof. The bearing 121 which is formed at the front end of the camshaft 87 has a somewhat enlarged support 122 which projects into a recess 123 formed in the front wall 31 of the block 11 from the flange 118 downwardly. A narrow space 124 is provided around the support 122 for the front bearing 121 and within the notch 123 to provide clearance therein and communication between the camshaft gallery 21 and the interior of the timing gear cover 47.

The engine heads 12 and 13 are formed to provide plane lower surfaces indicated at 126, these being made to fit the upper ends of the cylinder banks 16 and 17 and to engage the outer ends of the cylinders 22 around the combustion chambers 127 formed in the heads 12 and 13 for each of the cylinders 22. The heads 12 and 13, the cylinder banks 16 and 17 and the cylinders 22 are made in such a way that the plane surfaces 126 extend normally with respect to the axes of the cylinders 22. The heads 12 and 13 each have overhanging parts or ledges indicated at 128 and the lower surfaces of which are formed by the surfaces 126 extended beyond the ledges 117. The plane surfaces 126 beneath the overhanging parts 128 therefore form acute angular notches extending from the front to the rear of the heads in which the opposite edges of the support 14 are adapted to be disposed. The opposite edges of the support 14 are made in such a way as to provide a fluid tight fit with respect to the surface of the ledges 117 and the overhanging parts of the plane surfaces 126. The support 14 is held in position upon the ledges 117 by bolts which project through the heads 12 and 13, through openings 129 formed in the support 14 and into threaded openings in bosses 131 formed at the upper extremities of the inside walls of the cylinder banks 16 and 17 and inwardly of the ledges 117. The heads 12 and 13 also are secured to the support 14 by angularly disposed bolts which project through openings formed in bosses 132 in each of the heads and into threaded and angularly disposed openings 133 formed in the support 14. The support 14 also is secured to the rear wall 32 upon flange 119 by bolts which project through the supports and into openings indicated at 134. It will be apparent from the foregoing that the camshaft 87, the gear 82, and the support 14 can be removed from the engine by taking off the heads 12 and 13 and by releasing the bolts referred to which are employed in securing the support 14 in position between the block 11 and the heads 12 and 13.

The support 14 also has formed integrally therewith a plurality of laterally disposed bosses indicated by numerals 136 and 137. The boses 136 and 137 are arranged in pairs between the camshaft bearings 121 and on opposite sides of the camshaft 87. There is one pair of bosses 136 and 137 for each of the cylinders 22 of the engine and the pairs of bosses 136 and 137 are staggered with respect to one another on opposite sides of the space between the bearings 121. The bosses 137 are formed to provide cylindrical openings therein, the axes of which extend in the same plane, and these openings are adapted to receive valve lifters 138 which are adapted to be actuated by the cams of the camshaft 87. The bosses 136 also are formed in such a way as to provide upwardly inclined openings in which valve lifters 138 also are slidably disposed and held in position to be actuated by other cams of the camshaft 87. The valve lifters 138 in the bosses 137 are adapted to actuate push rods 139 which extend through openings 140 formed in the block 11 and the heads 12 and 13 and the opposite ends of which engage rocker arms 141 which are employed in actuating the exhaust valves 142 for the cylinders of the engine 10. The rocker arms 141 are supported by parallel and vertically disposed shafts 143 which are secured in bosses 144 formed in the heads 12 and 13 and in brackets 146 which are secured to the heads 12 and 13 by bolts indicated at 147. The valves 142 employ springs 145 to close exhaust ports 148 which are connected by exhaust passages 149 to branches 151 of exhaust manifolds indicated generally at 152. The branches 151 are tubular conduits at one end mounted in plates 153 secured by bolts 154 to the heads 12 and 13 and at the opposite end in the enlarged ends of an exhaust conduit indicated at 156. The exhaust manifolds 152 project vertically downwardly from each of the cylinder heads 12 and 13 so as to provide room inside the branches 151 for various accessory devices for the engine 10 and for the motor vehicle in which the engine may be mounted.

The valve lifters 138 in the bosses 136 are adapted to actuate push rods 157 which extend diagonally upwardly through aligned openings 135 formed in the support 14 and the heads 12 and 13 and engage rocker arms 158 which are adapted to actuate the inlet valves 159 for the cylinders of the engine 10. The rocker arms 158 for each bank of cylinders of the engine are supported on rocker shafts 161 which are mounted on the heads by shaft supports 162 secured to the heads by bolts indicated at 163. The valves 159 are closed by springs 164 against inlet ports 166 which lead from inlet passages 167 to the combustion chambers 127 of the cylinders of the engine. Each of the cylinders is provided with a spark plug 169, the terminals for which project into spaces between the valve actuating mechanisms for the inlet and exhaust valves for the engine. The inlet and exhaust valve actuating mechanisms are closed by covers 170 which form separate enclosures 171, 172 and 173 for the inlet and exhaust valve actuating mechanisms and the spaces between the enclosures 171 and 172, respectively. The covers are held in position upon the heads and with respect to one another by bolts indicated at 174.

It will be noted that the inlet and exhaust valves for each cylinder are disposed in planes that extend normally with respect to one another, that the axes of the exhaust valves 142 lie in the same plane and that the axes of the inlet valves 159 lie in parallel planes that are also parallel to the vertical plane of the engine 10. This valve arrangement and the actuating mechanism therefor is specifically disclosed and claimed in *Patent No. 2,765,781* [application Serial No. 274,436] for Valve Actuating Mechanism, filed in the United States Patent Office in the name of Joseph D. Turlay, March 1, 1952, and assigned to the same assignee [of this application].

[With the parallel inlet valve arrangement shown, it will be noted that the inlet passages 167 leading from the inlet ports 166 extend upwardly and laterally toward one another and terminate in passages that lie in the same plane. These passages terminate in the angularly disposed plane walls 126 of the heads 12 and 13 and communicate with outlet ports leading from branch passages 176 and 177 communicating with main distribution passages 178 and 179 of an engine inlet manifold 181 formed in the support 14. It will be noted that the main distribution passages 178 and 179 extend in parallel relation to one another and that these passages and the branch passages 177 leading to the inlet passages 167 of the engine all lie in the plane of the inlet ends of the inlet passages 167. It will be noted that the wall 182 separating the main distribution passages 178 and 179 terminates intermediate the ends thereof and adjacent an inlet opening 183 which is formed in the upper wall 184 of the manifold 181 midway between the opposite ends of the main distribution passages 178 and 179.] *It will be noted that the inlet passages 167 leading from the inlet ports 166 extend upwardly and then laterally inwardly toward one another in substantially the same plane, and terminate in ports in the plane walls 126. The outer ends of the passages 167 communicate with pairs of branch passages 177 and 178 at the ends of and on opposite sides of the inlet manifold 181 formed in the support 14. The pairs of passages 177 and 178 communicate with a main distribution passage 179 between the upper and lower walls 184 and 180, respectively, of the manifold 181, and on opposite sides of aligned supporting walls 182 at opposite end extremities of the main distribution passage 179. The outer ends of the passages 167 and the pairs of passages 177 and 178 at opposite ends of the manifold 181 are disposed substantially in coplanar relation and are symmetrically arranged relative to the main distribution passage 179 and the pairs of cylinders at the opposite ends of each row of cylinders of the engine. An inlet opening 183 is formed in the upper wall 184 of the manifold 181 mid-way between the ends and sides of the main distribution passage 179 and in substantially symmetrical relation to the pairs of passages 177 and 178. The main distribution passage 179 at the inlet opening 183 is at least as wide and as deep as at the extremities where the main distribution passage 179 communicates with the pairs of passages 177 and 178.* The opening 183 communicates with the outlet from the supercharger 115 which is secured to the support 14 upon the upper wall 184. The blower or supercharger [116] *115* is supplied with a combustible mixture for operating the engine by compound carburetors indicated at 186 and 187. The carburetors 186 and 187 are secured to the blower inlet by bolts indicated at 188. While any suitable fuel many be employed in the carburetors 186 and 187, in the present instance one of the carburetors is employed in supplying ordinary gasoline and the other methyl alcohol. The carburetors are connected together to operate as a single unit by an operating linkage 189 which controls the carburetors in such a way that the gasoline carburetor is employed exclusively in supplying fuel to the engine except at extremely high loads or speeds. At such times the operating mechanism will then open the throttle of the alcohol carburetor so that a combined mixture of gasoline and alcohol may be supplied to the engine.

The ignition timer or distributor for the engine indicated at 191 has a casing which is also secured to the support 14 upon an opening indicated at 190. The shaft 192 for the distributor carries a worm wheel which is adapted to be driven by a worm gear 193 secured to and driven by the rear end of the camshaft 87. An ignition coil 194 also is secured to the housing for the distributor 191 and supported by the support 14. On the opposite side of the support 14 and secured over an opening 196 formed therein is a tachometer and filler tube housing indicated at 197. A tachometer 198 secured to the housing 194 by bolts 199 has a drive shaft associated with the camshaft 87 of the engine for the purpose of registering the speed of the engine upon the instrument panel of the vehicle with which the engine may be employed. The housing 194 also has a coupling 201 at one side thereof with which a filler tube 202 is connected in such a way as to be aligned with the opening 196. A filler tube 202 may have a removable cap 203 containing suitable filtering material for cleaning air that may be admitted to the tube 202. The cap 203 may be removed for the purpose of filling the engine with oil. A blow-off valve, not shown, also may be secured to the support 14 upon an opening 204 which communicates with the main distribution passage[s 178 and] 179 of the inlet manifold 181. Lubricating oil supplied to the filler tube 202 will flow into the camshaft gallery 21 through the opening 196 and from the camshaft gallery 21, into the crankcase 18 through a plurality of relatively restricted openings 206 formed in a web 207 which extends between the lower edges of the inner walls of the cylinder banks indicated at 16 and 17. In the crankcase 18 the oil will collect in the rearwardly disposed and enlarged part of the crankcase cover 19 which forms the sump 44.

The oil within the sump 44 is circulated throughout the lubricating system of the engine by a pump 207 having a screened inlet 208 for receiving the oil from the sump 44. The pump 207 is secured in sump 44 to the side wall 34 of the crankcase 18 and the outlet thereof delivers oil to an oil filter 209 which is secured by bolts 211 to an integral bracket 212 formed outside the wall 34 at the rear end of the crankcase 18. From the oil filter 209 the oil from pump 207 is supplied through passages formed in the end wall 32 of the block 11 to an elongated passage 213 that is formed in the middle of the web 207 throughout the length of the camshaft gallery 21. From the passage 213 the oil is supplied to all of the main bearings of the engine through drilled passages indicated at 214. The bearing 56 at the rear end of the propeller shaft 57 is lubricated from the rear main bearing 29 by a drilled pasage 216 in the crankshaft 27 which communicates with a drilled passage 217 in the shaft 57. The passage 217 terminates in a laterally disposed passage 218 which supplies oil to the interior of the casing 53 in front of the bearing 56. The crankshaft 27 is drilled internally from the main bearings thereof to the crank arms 41 to supply oil to the bearings for the connecting rods 26. Adjacent the front end of the passage 213, the central part of the web 207 is enlarged in such a way as to provide a boss 219 having an upwardly disposed drilled opening therein and communicating with the passage 213. The boss 219 is disposed directly opposite a boss 221 which is formed on the lower extremity of one of the camshaft bearings 121. The boss 221 is provided with a drilled opening which is directly opposite the drilled opening in the boss 219. A coupling 222 is adapted to be secured in the opening in the boss 219 and has an end which projects upwardly into removable engagement with the opening in the boss 221. A sealing washer 223 is disposed around the coupling member and within a groove formed in the boss 219 to provide a tight seal between the bosses 219 and 221 when the frame member 14 is secured in position with the upper end of the coupling 222 projecting into the opening in the boss 221. A check valve 224 is provided in the bottom of the opening in the boss 219 to prevent return flow of oil to the passage 213 from the interior of the coupling 222. Each of the bearings 121 has a bushing indicated at 226 having an annular groove formed therein which is adapted to communicate with the drilled opening in the boss 221 and the interior of the coupling 222. The annular groove not only distributes oil to the interior of this particular bearing 121 but it conducts oil to drilled passages 227 and 228 which communicate with elongated passages 229 and 231 which are formed in the support member 14 above and on opposite sides of the camshaft 87 and below the main distribution passage[s 178 and] 179 of the inlet manifold 181. The remaining camshaft bearings 121 are also provided with drilled passages indicated at 232 which extend from the passages 229 and 231 to annular grooves which are formed in the bushings 226 of the remaining bearings 121. The passages 229 and 231 also intersect the bosses 136 in such a way as to supply oil to the valve lifters 138 therein. Passages 233 are drilled between the passages 229 and 231 to the bosses 137 to supply oil to the valve lifters 138 in the bosses 137. The front ends of the passages 229 and 231 also communicate with drilled openings 234 that extend upwardly and outwardly through the support 14 and the front walls of the heads 12 and 13. These openings communicate with passages in one of the supports 162 which lead to openings formed lengthwise in the rocker shafts 161. The rocker arms 158 are lubricated by oil from the passages within the rocker shafts 161 and the ends of the push rods 157 and the stems of the valves 159 also are lubricated by oil which escapes rocker shaft bearings. The drilled passages 234 in the front of the heads 12 and 13 also communicate with passages 236 that are formed along the length of the heads 12 and 13 and adjacent the lower ends of the vertically disposed rocker shafts indicated at 143. The rocker arms 141, the stems of the valves 142 and the ends of the push rods 139 likewise are lubricated from the passages 236 through passages formed in the rocker shafts 143.

It will be apparent that the oil which escapes from the camshaft bearings 121 will be thrown radially outwardly in all directions. Some of this oil will collect upon the outwardly curved surfaces of a fin 237 which projects from the lower surface of the support 14 between the bearings 121 immediately above and throughout the length of the camshaft 87. This fin is curved or notched along the lower edge thereof in such manner as to provide spaced and downwardly extending projections indicated at 238. One of the projections 238 is located above each cam for the camshaft 87. It will be apparent that the oil which is collected upon the exterior surface of the fin 237 will flow by gravity from the lower ends of the projections 238 and will fall upon and lubricate the cams of the camshaft 87. The timing chain 83 and the timing chain gears or sprockets 78 and 86 are lubricated by oil which collects upon the walls at the front end of the camshaft gallery 21 and which flows into the interior of the timing chain cover through the passage or clearance 124. This oil will run downwardly on the front wall 31 of the block 11 and will collect on the end of an oil collector indicated at 238 secured to the front wall 37 by a screw 239. The oil will drip from the point of the collector 238 upon the sprocket 78 and from which the chain 83 and the sprocket 82 will be oiled.

The crankcase 18 and the camshaft gallery 21 are ventilated by air admitted to the rear end of the camshaft gallery 21 through the filler tube 202. The air so admitted will flow forwardly through the camshaft gallery 21 and downwardly into the crankcase 18 through the restricted openings indicated at 206. The front of the camshaft gallery 21 is in open communication with the interior of the timing gear cover 47 through the passage 124 and the front of the crankcase 18 is likewise in open communication with the interior of the timing gear cover 47 through openings that are formed in the front wall 31 on opposite sides of the front main bearing 28. The interior of the timing chain cover 47 communicates with the forward end of an elongated passage 241 which is formed in the side wall 36 of the crankcase 18. The rear end of passage 241 merges in a chamber 242 on which a filter unit 243 is connected by a bolt 244. The filter unit 243 has an outlet in the form of a downwardly and rearwardly projecting draft tube indicated at 246. The motion of the vehicle and the draft caused by the operation of the fan 102 will cause a flow of air beyond the open end of the draft tube 246 that will induce a flow of air into the filler tube 202 and throughout the camshaft gallery 21 and the crankcase 18 as previously described.

In order to ventilate and to drain the oil from the interior of the covers 171, 172 and 173, there is provided in the block 11 a plurality of passages 258 which are formed at the outside of each of the cylinder banks 16 and 17 in webs 259 that project between the cylinders. The lower ends of these passages communicate with the crankcase 18 while the upper ends thereof communicate with drilled passages formed in the heads 12 and 13 and the upper ends of which communicate with the space within the exhaust valve covers 172. The adjacent walls of the covers 171 and 172 have slots 261 along the lower edges thereof to permit the interior of the covers 271 and 273 to drain into the interior of the cover 272. The covers 273 for the compartments containing the spark plugs 169 are provided with a plurality of openings indicated at 262 for the purpose of admitting air to cool the spark plugs 169. It will be apparent that not only will oil drain from the compartments provided by the covers 171, 172 and 173, but air will be admitted through the opening 262 which will flow into the crankcase 18 through the passages 258.

Water, or other suitable cooling liquid for the cooling system of the engine, is circulated through the engine by a pump secured to the front end of the left hand bank of cylinders 17 and which is driven by the fan belt 99. Liquid from the pump is discharged into the jacket 247 surrounding the cylinders 22 in the cylinder bank 17. The front end of the jacket 247 also communicates with the front end of a jacket 248 for the cylinders 23 of the cylinder bank 16 through a crossover passage 249 which is formed at the front of the camshaft gallery 21 and within the front part of the web 207. It will be apparent that water supplied by the pump will tend to flow rearwardly in the jacket 247, through the crossover passage 249 and rearwardly within the jacket 248. The liquid is conducted from the rear end of each of the jackets 247 and 248 to the rear ends of the cooling liquid passages 251 and 252 formed in the heads [17 and 16] *13 and 12* respectively, by flexible conduits connected between the jackets and passages at the rear of the engine. From the cooling liquid passages 251 and 252 the water is exhausted by a water manifold to a surge tank indicated at 253. The surge tank 253 is secured across the front of the engine and upon the support 14 by bolts indicated at 254. It will be noted that the surge tank 253 is above any part of the cooling liquid jacket space in the engine and therefore may be used as a reserve supply tank for excess cooling liquid that may be required to operate the system. Tanks similar to the tank 253 ordinarily are located at the top of the radiator of the engine but if located on top of the engine as shown, then it will be apparent that the radiator can be located in a lower position at the front of the engine. The surge tank 253 is provided with a filler cap 256 for filling the tank and an outlet 257 by which the interior of the tank is connected to the radiator for the engine.

Figure 4:
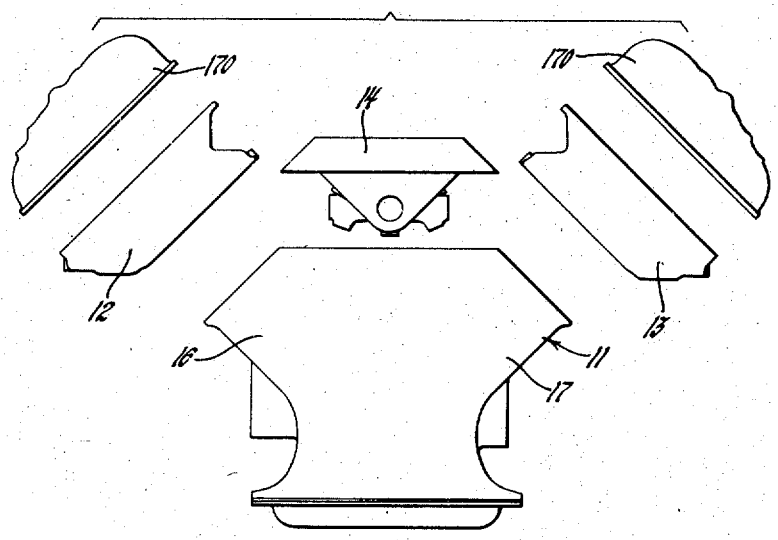
Figure 4 is an exploded end view of the principal assembly units of the engine disclosed by Figures 1 and 2.
Figure 5:
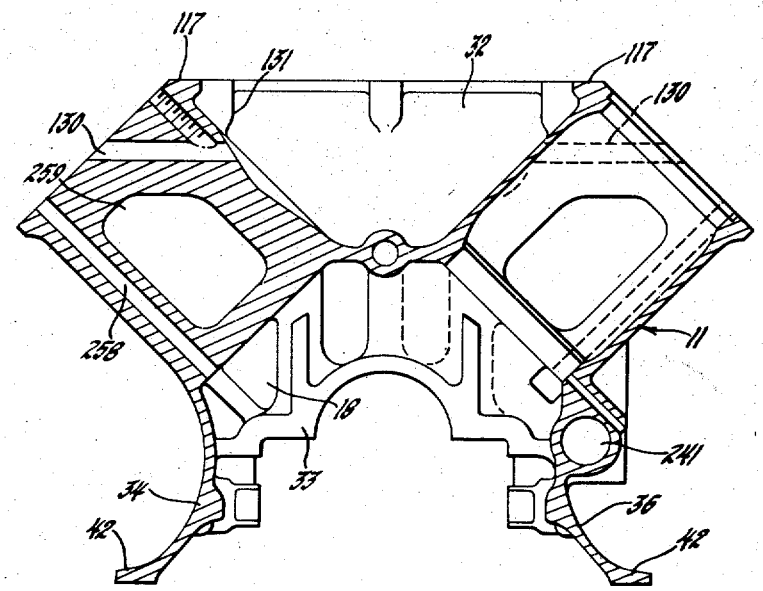
Figure 5 is a cross-sectional view of the engine block taken substantially in the plane of line 5—5 on Figure 3, looking in the direction of the arrows thereon.
Figure 6:
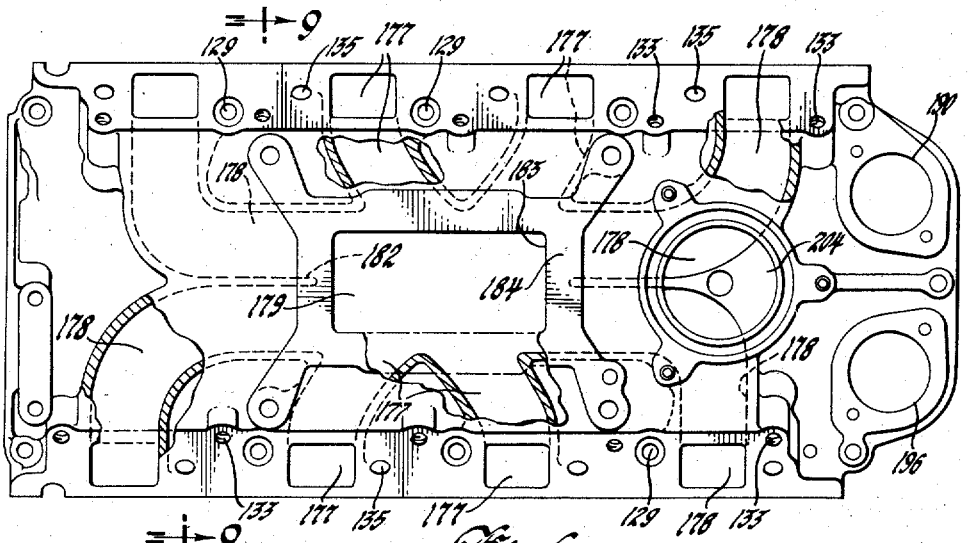
Figure 6 is a plan view of a support member forming a part of the charge forming device and timing mechanism unit employed in the engine disclosed by Figures 1 and 2.
Figure 7:
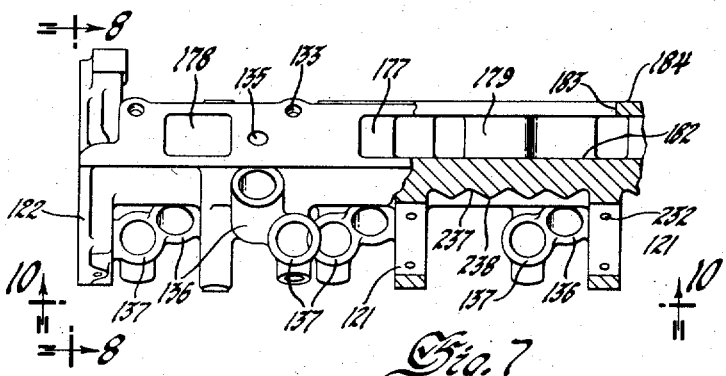
Figure 7 is a fragmentary side elevational view with parts thereof broken away, of the structure disclosed by Figure 6.
Figure 8:
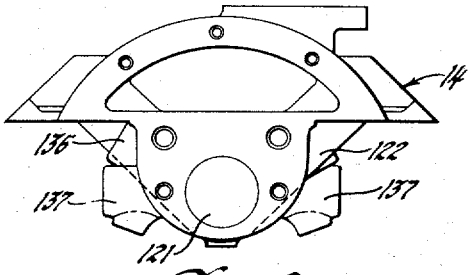
Figure 8 is a front end elevational view of the structure disclosed by Figure 7.
Figure 9:
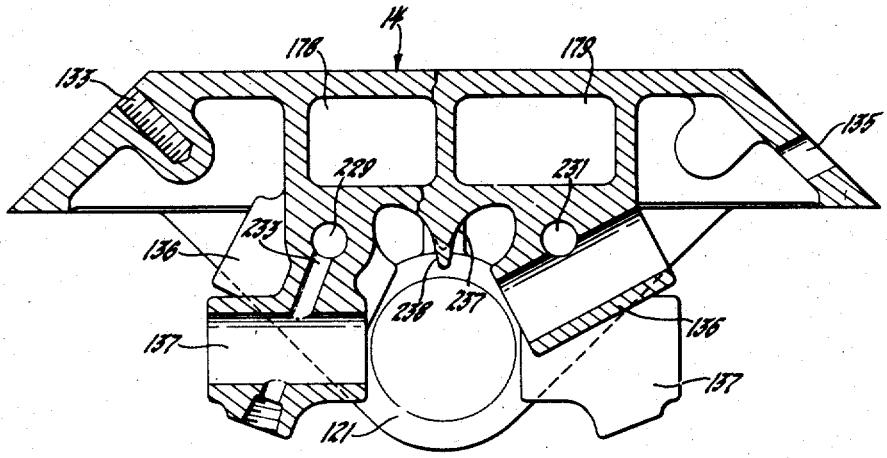
Figure 9 is a transverse sectional view of the support member disclosed by Figures 6, 7 and 8.
Figure 10:
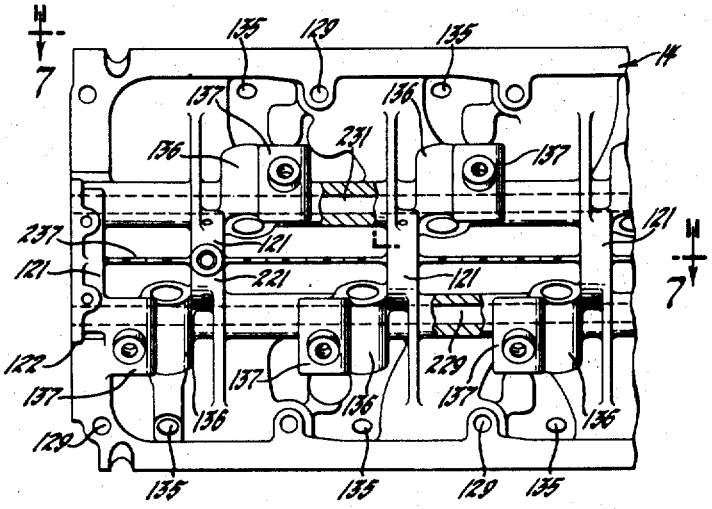
Figure 10 is a fragmentary bottom plan view with parts thereof broken away, of the support member disclosed by Figures 6 and 7.

Referring to Figure 4, it will be apparent that the principal element of the engine can be assembled and disassembled by locating the support 14 within the camshaft gallery 21, securing the support 14 in position by attaching the various bolts for securing the heads 12 and 13 to the cylinder banks 16 and 17 of the block 11 and then securing the covers 170 to the heads 12 and 13. If desired, the heads 12 and 13 may be secured to the block with all the valve operating mechanisms and spark plugs in position within the heads and the support 14 likewise may be secured in position with the camshaft 87, the blower 115, the carburetors *186 and 187* [166 and 167], the distributor 191, the coil 194, the tachometer 198 and the tube 202 in operative positions. The support 14 also may be removed with all of the various elements installed in operative relation merely by removing the heads 12 and 13 and then withdrawing the mechanism unit embracing the support 14 from the gallery 21.

I claim:

1. A V-type engine comprising an engine block formed to provide a camshaft gallery between adjacent walls of the angularly disposed banks of cylinders thereof, said block also being formed to provide a transversely disposed pair of end walls having outer edges between said banks and at the opposite ends of said camshaft gallery in said block, a camshaft for said engine adapted to be rotatably mounted in said camshaft gallery, a support for said camshaft disposed within said camshaft gallery and having bearings formed therein for rotatably supporting said camshaft, said support and said block being formed to provide abutment means extending along the length of and between said banks and across the outer edges of said end walls and the outer ends of said cylinders for supporting said support with respect to said block.

2. A V-type engine comprising an engine block having a camshaft gallery formed between adjacent walls of the banks of cylinders thereof, a support extending transversely across said camshaft gallery and at the opposite edges thereof engaging the outer edges of said adjacent walls, camshaft bearing means formed in said support, and a camshaft for said engine rotatably mounted in said camshaft bearing means, said outer edges of said adjacent walls being the edges thereof remote from the crankcase of said engine and adjacent the outer ends of the cylinders in said banks.

3. A V-type engine comprising an engine block having a camshaft gallery formed between adjacent walls of the banks of cylinders formed in said block, a removable support extending throughout the length of said camshaft gallery, means adjacent and extending across the outer ends of the cylinders in said banks for supporting said support, and a camshaft mounted in said support and removable therewith.

4. A V-type engine comprising an engine block having parallel and angularly disposed rows of cylinders formed therein, a support adapted to be removably disposed between adjacent walls of said rows of cylinders, said support and said block being formed to provide abutment means between said rows of cylinders and adjacent the outer ends of the cylinders in said rows for mounting said support upon said block, means for securing said support rigidly to said block and upon said abutment means, bearing means formed in said support and extending throughout the length of said support, and engine timing means mounted in said bearing means.

5. A V-type engine comprising a block formed to provide angularly disposed banks of cylinders therein, said banks of cylinders having coplanar ledges formed along the outer edges of the adjacent walls thereof, a bearing support member disposed on said ledges and having bearing means formed therein along the length of said member, and a head for each bank of cylinders of said engine, each of said heads being formed to overlap said ledges and to engage said support member for securing said support member in position between said banks of cylinders, and engine timing means mounted in said bearings in said support member.

6. A V-type engine comprising an engine block having angularly disposed rows of aligned cylinders formed therein, engine heads secured to said block upon said rows of cylinders and being formed to extend beyond said rows of cylinders on the adjacent sides thereof, and an elongated camshaft bearing support engaged by and secured between the inwardly extending sides of said heads and said rows of cylinders.

7. An internal combustion engine comprising angularly disposed banks of aligned cylinders containing pistons operable by a single crankshaft, engine heads for each of said banks of cylinders, the engine heads for said cylinders being of greater width than said banks of cylinders and being adapted to overlap said banks of cylinders on adjacent sides of said banks of cylinders, a support extending across the space between said banks of cylinders and projecting beneath the overlapping parts of said heads, and abutment means formed on the adjacent walls of said banks of cylinders, the edges of said support being secured between said overlapping parts and said abutment means beneath said heads.

8. An internal combustion engine having adjacent and obliquely disposed rows of aligned cylinders and comprising a pair of engine heads having plane lower surfaces secured against said rows of cylinders with said surfaces normal to the axes of said cylinders and in planes intersecting between said cylinders, said heads being wider than said rows of cylinders and having sides adapted to overhang said rows of cylinders on the adjacent sides of said rows of cylinders, said overhanging sides of said heads being formed to provide inlet ports in said surfaces with said inlet ports forming the inlet ends of inlet passages leading to inlet valves in said heads, an inlet manifold mounted between said heads and engaging said surfaces on the overhanging sides of said heads and having outlet ports therein disposed in directly opposed relation to said inlet ports in said heads, said outlet ports forming the outlet ends of inlet passages formed in said manifold and communicating with mixture supply means for supplying combustible charges to said cylinders through said passages and ports in said manifold and said heads, said inlet passages in said manifold being disposed above a plane intersecting the lower walls of said inlet passages in said heads.

9. An internal combustion engine having inlet and exhaust valves and comprising an engine block having adjacent rows of aligned cylinders formed therein, an inlet manifold for said engine and adapted to be disposed between said rows of aligned cylinders and to be connected with inlet passages formed on adjacent sides of said aligned cylinders, bearing means formed in said inlet manifold and extending along the length of said engine block, valve actuating means in said bearing means for operating the inlet and exhaust valves of said engine, and means for removably securing said inlet manifold and bearing means to said block between said rows of cylinders.

10. An internal combustion engine having adjacent rows of aligned cylinders and comprising a pair of engine heads having plane lower surfaces secured to said rows of cylinders with said lower surfaces extending normally with respect to the axes of said cylinders, said rows of cylinders also being formed to provide coplanar surfaces adjacent the outer ends of adjacent walls of said rows of cylinders and terminating at and intersecting said plane lower surfaces of said heads, and support means extending between said rows of cylinders and having edges projecting within and formed to fit between said plane lower surfaces of said heads and said coplanar surfaces at said ends of said rows of cylinders.

11. An internal combustion engine having adjacent rows of aligned cylinders and comprising a pair of engine heads having plane lower surfaces secured to said rows of cylinders with said lower surfaces extending normally with respect to the axes of said cylinders, said rows of cylinders also being formed to provide coplanar surfaces adjacent the outer ends of adjacent walls of said rows of cylinders and terminating at and intersecting said plane lower surfaces of said heads, support means extending between said rows of cylinders and having edges projecting within and formed to fit between said plane lower surfaces of said heads and said coplanar surfaces at said ends of said rows of cylinders, said support having inlet manifold passage means formed therein and communicating with inlet passage means formed in said rows of cylinders through ports formed in said support and in said plane lower surfaces of said heads.

12. An internal combustion engine having timing mechanism and adjacent rows of aligned cylinders and comprising a pair of engine heads having plane lower surfaces secured to said rows of cylinders with said lower surfaces extending normally with respect to the axes of said cylinders, said rows of cylinders also being formed to provide coplanar surfaces adjacent the outer ends of adjacent walls thereof and terminating at and intersecting said plane lower surfaces of said heads, support means extending between said rows of cylinders and having edges projecting within and formed to fit between said plane lower surfaces of said heads and said coplanar surfaces at said ends of said rows of cylinders, said support means having bearing means formed therein for operatively supporting a part of the timing mechanism of said engine.

13. An internal combustion engine having push rods and valves and adjacent rows of aligned cylinders and comprising a pair of engine heads having plane lower surfaces secured to said rows of cylinders with said lower surfaces extending normally with respect to the axes of said cylinders, said rows of cylinders also being formed to provide coplanar surfaces adjacent the outer ends of adjacent walls thereof and terminating at and intersecting said plane lower surfaces of said heads, support means extending between said rows of cylinders and having edges projecting within and formed to fit between said plane lower surfaces of said heads and said coplanar surfaces at said ends of said rows of cylinders, said support means having laterally disposed bearings formed therein and extending lengthwise of said engine for supporting the push rods for operating the valves of said engine.

14. An internal combustion engine having a camshaft and adjacent rows of aligned cylinders and comprising a pair of engine heads having plane lower surfaces secured to said rows of cylinders with said lower surfaces extending normally with respect to the axes of said cylinders, said rows of cylinders also being formed to provide coplanar surfaces adjacent the outer ends of adjacent walls thereof and terminating at and intersecting said plane lower surfaces of said heads, support means extending between said rows of cylinders and having edges projecting within and formed to fit between said plane lower surfaces of said heads and said coplanar surfaces at said ends of said rows of cylinders, said support means having aligned bearings formed therein and extending lengthwise of said engine for supporting the camshaft of said engine.

15. An internal combustion engine comprising a block having adjacent rows of aligned cylinders formed therein and forming a gallery in said block between said rows of cylinders, a pair of heads for said cylinders, a unitary structure releasably disposed within said gallery and adapted to be secured between spaced surfaces on adjacent sides of said heads and said block, charge forming, charge distributing and valve actuating means for operating said engine and associated with said unitary structure, and means for removably clamping said unitary structure between said heads and said block and against said surfaces.

16. An internal combustion engine having adjacent rows of aligned cylinders and comprising a plurality of inlet valves on adjacent sides of said cylinders in each row, inlet passages formed in said rows of cylinders with the outer ends of said inlet passages in each row being directed toward the other row and in coplanar relation, said inlet passages having inner ends directed inwardly of said cylinders and toward said valves and in parallel relation, an inlet manifold between said rows of cylinders and being formed to provide main distribution passages and branch passages all in the plane of said outer ends of said inlet passages, and means for supplying a mixture of fuel and air to said main distribution passages intermediate the ends of said main distribution passages.

17. An internal combustion engine comprising an engine block having angularly disposed rows of aligned cylinders formed therein, said block being formed to provide side walls extending throughout the length of said rows and end walls at the ends of said rows extending between said side walls, heads engaging said walls and enclosing the ends of said cylinders in said rows, a support disposed between said heads and engaging said heads along the sides of said support and said end walls along the ends of said support, means for securing said block and said heads and said support rigidly together to provide an engine frame, pistons mounted in said cylinders in said rows, shaft means mounted in said frame and operatively associated with said pistons, and means associated with said frame for operating said pistons.

18. An internal combustion engine as defined by claim 17 and in which inlet passage means is formed in said support and said heads and leading to intake valves in said head and opening into said cylinders.

19. An internal combustion engine as defined by claim 17 and in which fluid tight surfaces are provided between said edges of said support and said heads and between said ends of said support and said end walls.

20. A V-type engine comprising an engine block formed to provide a camshaft gallery between adjacent walls of the angularly disposed banks of cylinders thereof and having piston and crankshaft and timing means for operating said engine, said block also being formed to provide a transversely disposed pair of end walls having outer edges between said banks and at the opposite ends of said camshaft gallery, a support extending across and adapted to close said camshaft gallery, said support and said block being formed to provide abutment means extending along the length of and between said cylinder banks and across the outer edges of said end walls and adjacent the outer ends of said cylinders, and a pair of engine heads secured rigidly to said support and said block.

21. An internal combustion engine comprising an engine block having angularly disposed rows of cylinders formed therein and having piston and crankshaft and timing means for operating said engine, said block being formed to provide side walls extending throughout the length of said rows and end walls at the ends of said rows and extending between said side walls, heads engaging said side walls and closing the ends of said cylinders, a support disposed between said heads and engaging said heads along the sides of said support and said end walls along the ends of said support, and means for securing said block and said heads and said support rigidly together to provide an engine frame.

22. An internal combustion engine as defined by claim 21 and in which a pair of said side walls is provided for each of said rows of cylinders and in which said support engages the outer edges of the adjacent side walls of said pairs.

*23. An internal combustion engine having adjacent rows of aligned cylinders and heads for each row of said cylinders and inlet passages in said heads and valves in said heads and controlling said inlet passages in said heads and the admission of combustion fluid to said cylinders, said inlet passages in said heads extending upwardly and inwardly from said valves, an inlet manifold having a main distribution passage and branch passages between spaced upper and lower and substantially plane walls of said manifold, said branch passages at the inlet ends communicating with said main distribution passage between said walls and at the outlet ends extending beyond said walls and including said inlet passages, said branch passages at each end of said manifold and on each side of said manifold and in said heads providing oppositely disposed pairs of branch passages communicating with adjacent pairs of cylinders at the ends of said rows of cylinders, said oppositely disposed pairs of said branch passages at each end of said manifold being disposed in coplanar relation and in substantially the same relation to said main distribution passage in said manifold, and supply passage means in said upper wall of said manifold and leading to said main distribution passage, said supply passage means being disposed in substantially the same relation to the end extremities of said main distribution passage and to said oppositely disposed pairs of said branch passages in said manifold and said heads, said main distribution passage being at least as wide and as deep at said supply passage means as at said extremities where said main distribution passage communicates with said pairs of branch passages at said ends of said manifold.*

*24. An internal combustion engine having adjacent rows of aligned cylinders and heads for each row of said cylinders and inlet passages in said heads and valves in said heads and controlling said inlet passages in said heads and the admission of combustion fluid to said cylinders, said inlet passages in said heads extending upwardly and inwardly from said valves, an inlet manifold having a main distribution passage and branch passages between spaced upper and lower and substantially plane walls of said manifold, said branch passages at the inlet ends communicating with said main distribution passage between said walls and at the outlet ends extending beyond said walls and including said inlet passages, said branch passages at each end of said manifold and on each side of said manifold and in said heads providing oppositely disposed pairs of branch passages ocmmunicating with adjacent pairs of cylinders at the ends of said rows of cylinders, said oppositely disposed pairs of said branch passages at each end of said manifold being disposed in coplanar relation and in substantially the same relation to said main distribution passage in said manifold, and supply passage means in said upper wall of said manifold and leading to said main distribution passage, said supply passage means being disposed in substantially the same relation to the peripheral extremities of said main distribution passage and to said oppositely disposed pairs of said branch passages in said manifold and said heads, said main distribution passage being at least as wide and as deep at said supply passage means as at said extremities where said main distribution passage communicates with said pairs of branch passages at said ends of said manifold, said pairs of branch passages being connected to said main distribution passage at substantially equal intervals throughout the peripheral extremities of said main distribution passage and being curved in opposite directions away from and at the end extremities of said main distribution passage and on opposite sides of aligned separting wall means at the end extremities of said main distribution passage.*

References Cited in the file of this patent or the original patent

UNITED STATES PATENTS

| | | |
|---|---|---|
| 888,282 | Westendarp | May 19, 1908 |
| 1,022,413 | Goldstine | Apr. 9, 1912 |
| 1,308,465 | White | July 1, 1919 |
| 1,316,527 | White | Sept. 16, 1919 |
| 1,332,964 | Vincent | Mar. 9, 1920 |
| 1,427,190 | Brown | Aug. 29, 1922 |
| 1,438,877 | Tobeler | Dec. 12, 1922 |
| 1,529,188 | Kettering | Mar. 10, 1925 |
| 1,531,430 | Wrentmore | Mar. 31, 1925 |
| 1,625,597 | Fornaca | Apr. 19, 1927 |
| 1,738,159 | Van Ranst | Dec. 3, 1929 |
| 1,862,723 | Summers | June 14, 1932 |
| 1,897,783 | Anibal | Feb. 14, 1933 |
| 1,940,427 | Lindenberg | Dec. 19, 1933 |
| 1,955,799 | Fielden | Apr. 24, 1934 |
| 2,062,209 | Cook | Nov. 24, 1936 |
| 2,098,424 | Kolimbat | Nov. 9, 1937 |
| 2,124,403 | McIntyre | July 19, 1938 |
| 2,158,388 | Taylor | May 16, 1939 |
| 2,160,922 | Sullivan | June 6, 1939 |
| 2,429,105 | Paxman | Oct. 14, 1947 |
| 2,429,106 | Paxman | Oct. 14, 1947 |
| 2,523,611 | Clayton | Sept. 26, 1950 |

FOREIGN PATENTS

| | | |
|---|---|---|
| 658,535 | Germany | Apr. 5, 1938 |
| 101,776 | Sweden | June 10, 1941 |